United States Patent [19]

White, Jr.

[11] 3,863,449

[45] Feb. 4, 1975

[54] HYDRAULIC MOTOR FLUID FLOW CIRCUITRY

[75] Inventor: Hollis N. White, Jr., West La Fayette, Ind.

[73] Assignee: TRW Inc., Cleveland, Ohio

[22] Filed: Aug. 27, 1973

[21] Appl. No.: 392,019

[52] U.S. Cl. ............... 60/456, 60/464, 418/61 B
[51] Int. Cl. .................................... F15b 21/04
[58] Field of Search ............ 60/456, 464, 468, 488; 418/61 B

[56] References Cited
UNITED STATES PATENTS

| | | | |
|---|---|---|---|
| 2,961,829 | 11/1960 | Weisenbach | 60/484 |
| 3,396,536 | 8/1968 | Miller et al. | 60/456 X |
| 3,601,513 | 8/1971 | White | 418/61 B |
| 3,636,708 | 1/1972 | Karman et al. | 60/464 X |
| 3,744,244 | 7/1973 | Swoager | 60/454 |

*Primary Examiner*—Edgar W. Geoghegan

[57] ABSTRACT

A hydrostatic drive system employs an improved fluid motor having a shuttle valve to direct a predetermined portion of the fluid flowing through the motor along with the drain line flow from a variable volume pump, to a heat exchanger then to a fluid reservoir. A charge pump is provided to supply the primary fluid circuit with a quantity of fluid from the reservoir to equal the combined shuttle and drain line flow.

9 Claims, 4 Drawing Figures

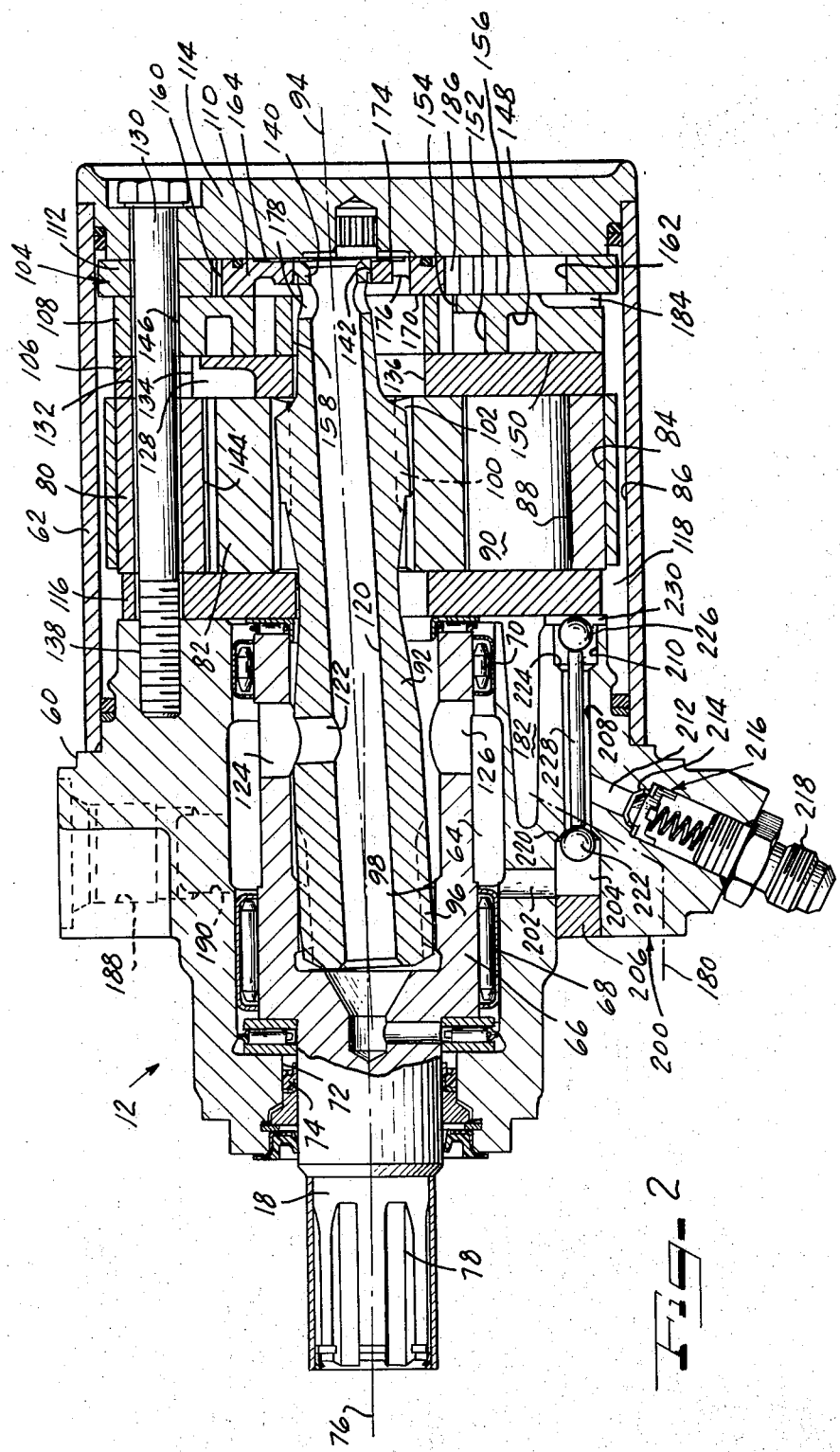

HYDRAULIC MOTOR FLUID FLOW CIRCUITRY

BACKGROUND OF THE INVENTION

1. Field of the Invention

This invention generally relates to hydrostatic drive systems, and is more particularly concerned with a hydrostatic drive system which has a closed loop of oil flow between a pump and the drive motor.

2. Description of the Prior Art

In hydrostatic drive systems which have a closed loop of fluid flow between the pump and the drive motor it is necessary to exchange a percentage of the loop fluid for fluid with fluid which has been cooled. This function can be achieved by branching off a secondary fluid circuit to a heat exchanger and then returning the cooled fluid to the main loop. This technique can, however, require the provision of additional components to establish the connections between the primary and secondary fluid circuits. In addition, the connections between primary and secondary circuits can become more complicated in the systems in which the motor is to be operated in both directions since it is desirable to utilize the pressure difference occurring between the high pressure side and the low pressure side of the motor for effecting the branching function.

SUMMARY OF THE INVENTION

It is therefore highly desirable to have and a primary object of the invention to provide a simplified hydrostatic drive system of the kind mentioned above which does not require additional and complex fluid branching circuits and components for establishing such circuits.

Another object of the invention is to provide a new and improved torque motor for a closed loop hydrostatic drive system which incorporates, as an integral component thereof, apparatus for automatically establishing a secondary fluid circuit for connection to a system heat exchanger.

The above and other objects of the invention are achieved in a hydrostatic drive system which comprises a variable volume pump which is connected in a series fluid circuit with a hydraulic motor. The pump is manually adjustable to operate the hydraulic motor in both directions. The series fluid circuit is fed or charged by a charge pump which draws hydraulic fluid from a reservoir and which is provided with a system safety relief valve for shunting the charge pump discharge to the reservoir in response to pressures which would damage the components of the system and which are above a predetermined pressure level expected in normal system operation, as is well understood by those skilled in the art.

A portion of the fluid traversing the variable volume pump is discharged through a drain line and fed to a heat exchanger, from where it is cooled and fed to the fluid reservoir. The hydraulic motor is provided with means for branching off to the heat exchanger a portion of the fluid fed to the hydraulic motor for the purpose of cooling this fluid. This branching means is in the form of a valve structure, hereinafter called a shuttle valve, within the hydraulic motor. Inasmuch as a hydraulic motor may be operated in either direction and therefore have a pressure differential in either direction across its fluid circuit or a portion of that circuit, the shuttle valve is constructed to operate in response to a pressure differential in either direction. In a preferred embodiment of the invention, a fluid passageway is provided within the motor between two locations which experience such a pressure differential. The fluid passageway includes a pair of oppositely directed valve seats disposed in fluid communication with points of different pressures within the motor, a pair of ball type valves for engagement with respective ones of the seats, a rod extending between the ball valve members, the rod having a diameter that is less than the diameter of the passageway through which it extends, and another passageway extending from a point between the valve seats and the exterior of the hydraulic motor. The latter passageway may advantageously include a second valve for making shuttle flow dependent upon a predetermined pressure differential, and protect the motor against reverse pressure surges.

The shuttle valve may advantageously be provided with a pair of springs for urging the ball valve members toward each other to provide a dead band shuttle flow for a neutral dead band on a manually controlled swash plate pump. With this construction, a shuttle flow is established about each of the ball valve members until there is a flow restriction sufficient to effect a pressure build up which will compress one of the springs which, in turn, will close one of the ball valves and establish rotation for the motor.

BRIEF DESCRIPTION OF THE DRAWINGS

Other objects, features and advantages of the invention, its organization, construction and operation will be best understood from the following detailed description of certain embodiments of the invention taken in conjunction with the accompanying drawings, on which:

FIG. 2 is a sectional elevation of a well known type of hydraulic motor which incorporates an embodiment of the invention showing shuttle valve operation for one direction of pressure differential;

DESCRIPTION OF THE PREFERRED EMBODIMENTS

Figure 1:
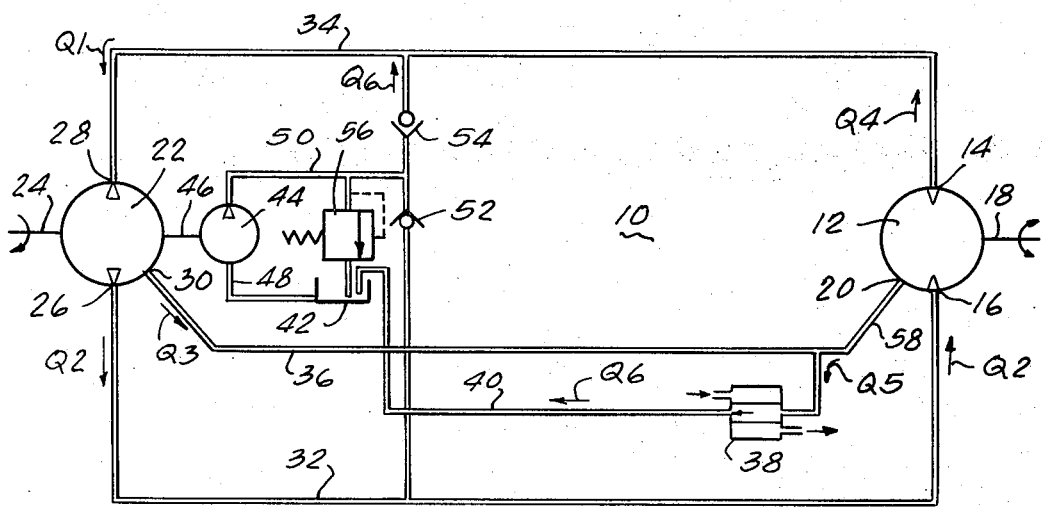
FIG. 1 is a schematic fluid circuit of a hydrostatic drive system constructed in accordance with the invention.

Referring first to FIG. 1, a hydrostatic drive system is schematically illustrated at 10 as generally comprising a hydraulic motor 12 having a pair of inlet (outlet) ports 14 and 16, an output shaft 18, and a shuttle valve outlet 20. A variable volume pump 22, which may be manually controlled pump and more particularly a manually controlled swash plate pump, is illustrated as comprising an input shaft 24, a pair of inlets (outlets) 26 and 28, and a drain line outlet 30.

Inasmuch as the inlet and outlet functions of the pump may be interchanged and as the inlet and outlet functions of the hydraulic motor may interchange, these inlets and outlets will hereinafter be simply referred to as ports. The port 14 of the motor 12 is connected to the port 28 of the pump 22 by way of a conduit 34. Similarly the port 16 of the motor 12 is connected to the port 26 of the pump 22 by way of a conduit 32. The port 30 of the pump is connected by way of a conduit 36 to a heat exchanger 38 which, in turn, is connected by way of a conduit 40 to a fluid reservoir 42.

Fluid is drawn from the reservoir 42 by a charge pump 44 by way of a conduit 48 and delivered to the conduits 32 and 34 by way of a conduit 50 and a pair of check valves 52 and 54, respectively. The charge pump 44 is connected to and driven with the variable volume pump 22, as illustrated by the connection 46. As mentioned above, a safety relief valve 56 is provided for protecting the system components from excessive pressures. As can be seen in FIG. 1, the system relief valve 56 is connected to shunt fluid from the discharge side of the charge pump 44 to the reservoir 42.

The shuttle port 20 of the hydraulic motor 12 is connected to the heat exchanger 38 by way of a conduit 58, and as can be seen from FIG. 1 the drain line flow in the conduit 36 and the shuttle flow in the conduit 58 are conducted from the heat exchanger 38 to the reservoir 42 through the conduit 40. The charge pump 44 must therefore supply a fluid flow which is equal to the drain line flow plus the shuttle flow. As an example, assume a flow Q1 into the port 28 of the pump 22 of 50 G.P.M., a flow Q2 of 40 G.P.M. out of the port 26 and a drain line flow Q3 of 10 G.P.M. out of the port 30. The flow Q2 of 40 G.P.M. is supplied by way of the conduit 32 to the port 16 of the hydraulic motor 12. If it is additionally assumed that a flow Q4 is discharged from the port 14 of the hydraulic motor 12, then a shuttle flow Q5 of 10 G.P.M. is added to the flow Q3 of 10 G.P.M. to create a flow Q6 of 20 G.P.M. which is delivered to the fluid reservoir 42. The charge pump 44 therefore draws from the reservoir 42 and delivers to the conduit 34 the flow Q6 of 20 G.P.M. which combines with the flow Q4 of 30 G.P.M. to equal the initially assumed flow Q1 of 50 G.P.M.. A similar condition prevails for opposite rotation of the output shaft 18 when the conduit 34 is the high pressure line and the conduit 32 is the low pressure line. It will be appreciated that in either case means are provided as an integral part of the hydraulic motor for automatically establishing shuttle flow regardless of which conduit is the high pressure line.

The invention will be best understood from the following description of a well known type of hydraulic motor. The particular motor illustrated in FIG. 2 of the drawings is disclosed in U.S. Pat. No. 3,601,513 to which reference may be taken for additional details of such a hydraulic motor.

Referring to FIG. 2, a hydraulic motor which incorporates a preferred embodiment of the invention is generally referenced 12 and is illustrated as comprising a body 60 and a tubular casing 62 extending from the body. A generally cylindrical chamber 64 is formed within the body 60 and houses a tubular drive sleeve 66 which is journaled for rotation on a pair of bearings 68 and 70 spaced axially along the length of the drive sleeve 66. The motor illustrated and described herein may also function as a pump which has an input/output shaft 18; however, inasmuch as the present invention is directed to a hydraulic motor, this shaft will be referred to as the output shaft. The output shaft 18 extends through an opening 72 of the body 60 and is provided with suitable bearing and seal members 74. The shaft is connected in fixed assembly to the drive sleeve 66 for joint rotation therewith. The axis of rotation of the output shaft 18 is indicated in FIG. 2 by a broken line 76. Means are provided for coupling the output shaft to a driven member when the device functions as a hydraulic motor, as is the present case. Here, the shaft 18 is illustrated as having a spline 78, but may be adapted for connection by other means, such as a keyway, serrations, or the like.

A gerotor gear set is housed within the tubular shell 62 and comprises a pair of fluid displacement members 80 and 82 which cooperate to provide contracting and expanding fluid pockets or chambers. More specifically, the gear set may be referred to as an internally toothed or lobed stator and an externally toothed or lobed rotor. As illustrated in FIG. 2, the stator 80 comprises a cylindrical member having a peripheral wall 84 spaced radially inwardly of an inner wall 86 of the shell or casing 62. The stator 80 is centrally apertured to provide an inner wall in which are formed, in circumferentially spaced relation, a series of axially extending recesses 88 each of which houses a cylindrical vane member 90. The vane members together form the internal teeth or lobes of the stator 80. The spaces located between the vane members 90 comprise the fluid pockets or chambers which continually alternately expand and contract as the rotor 82 rotates to admit or expel fluid therefrom.

The rotor 82 is star shaped in radial cross section and comprises a plurality of teeth or lobes which in number equal one less than the number of lobes of the stator 80. Outer wall sections which interconnect pairs of adjacent lobes are shaped to generally correspond with the outer surfaces of the lobes.

The axis of the rotor 82 is offset with respect to the axis of the stator 80 such that movement of the rotor 82 with respect to the stator 80 is essentially hypocycloidal; that is, the movement of the rotor 82 possesses both rotary and orbital components, as will be understood by those skilled in the art.

The rotor 82 is rotatably interconnected with the drive sleeve 66 by means of an amplifying shaft part or wobble shaft 92 which has an axis of rotation indicated by the broken lines 94 and disposed at an angle to the axis of rotation of the output shaft 18. The wobble shaft 92 has a splined axial portion 96 connected to a complementary splined bore 98 of the drive sleeve 66 for joint rotation therewith and is also splined at another portion 100 to a bore 102 of the rotor 82. The splined at another portion 100 to a bore 102 of the rotor 82. The splines at the portions 96 and 100 are slightly curved to permit limited universal pivotal movement of the shaft 92 with respect to the drive sleeve 66 and the rotor 82.

In order to direct fluid to and from the fluid pockets in timed relation to the orbital and rotational movement of the rotor 82 with respect to the stator 80, the motor 12 includes a commutation valving arrangement indicated generally by the reference numeral 104. More specifically, the arrangement 104 comprises a pair of stationary valve plates 106 and 108 which may be referred to respectively as an intermediate plate and a manifold plate. The valving arrangement 104 also includes means providing commutation porting comprising a movable commutator valve plate 110. The commutator valve plate 110 is radially surrounded by a plate 112 which is located between a cover plate 114 and the manifold plate 108, and the plate 106 is located between the stator 80 and the rotor 82 on one side and the manifold plate 108 on the other side. A clamping plate 116 is disposed on one side of the stator 80 and the rotor 82 and the plates 106, 108, 112 and 116 are clamped in assembled relation by means of a plurality of threaded clamping bolts 130 which extend through registered bores formed in the respective plates and which are threaded into the body 60 of the unit 12 as indicated by the reference numeral 138.

The plates 106, 108, 112 and 116 are circularly shaped in vertical cross section and have diameters substantially equal to the diameter of the outer wall 84 of the stator 80, thereby providing an axially extending annular fluid flow passageway 118 along the inside wall 86 of the casing 62 between the plates 116 and 112. Other flow passageways are provided in the bores 120 and 122 formed in the wobble shaft 92 and in the bores 124 and 126 formed in the drive sleeve 66.

It is necessary to understand the various relationships between certain flow passages formed in the stationary plates 106 and 108 and the commutator valve plate 110 in order to understand the operation of the valving arrangement 104. The stationary plate 106 located immediately adjacent the stator 80 has a plurality of radial flow passages 128 formed therein. The passages 128 correspond in number to the number of fluid chambers formed between the vane members 90 of the stator 80, as well as to the number of clamping bolts 130 which extend axially therethrough in a corresponding number of circumferentially spaced bolt receiving axial bores 132. Each of the passages 138 oepnly communicates with its corresponding bore 132 and each of the bores 132 is oversized at a radially inner segment as indicated at the reference numeral 134. The plate 106 also has a central aperture 136 to receive the wobble shaft 92, the wobble shaft 92 having a forward or nose portion 140 which reaches the cover plate 114 and which is received in a central bore 142 formed in the commutator valve plate 110.

The passages 128 formed in the plate 106 extend radially inwardly of the inner wall 144 of the stator 80 such that the pockets or fluid chambers formed between the vane members 90 of the stator 80 are in open fluid communication therewith.

The manifold plate 108 also has a series of circumferentially spaced axial bores formed therein to receive the shanks of the clamping bolts 130, such bores being indicated at the reference numerals 146. In addition, a plurality of dog legged grooves 148 are formed in a radial face 150 and extend in a curved, but radially inwardly bent direction to a distal end 152 which communicates with an axial passage 154 of limited cross sectional area to an opposite face 156 of the plate 108. The passages 154 are disposed in a circular pattern around a concentric bore 158 extending axially through the plate 108 to receive the wobble shaft 92.

The commutator valve plate 110 is formed in the shape of a disc and includes a cylindrical peripheral wall 160 having a diameter substantially less than the diameter of an inner wall 162 of the plate 112 in which it resides. One radial face 164 of the commutator 110 slidingly engages an inner radial wall 166 of the cover plate 114; whereas, an opposite radial face 170 thereof slidingly engages a radial face 172 of the manifold plate 108. As illustrated in the drawing, a centrally disposed recess 174 is formed in the commutator valve plate face 164 in surrounding relation to the bore 142, and another recess 176 is formed in the face 170. The recess 174 is in communication with the axial bore 120 formed in the wobble shaft 92 since a forward wall 81 of the wobble shaft 92 is angularly disposed with respect to the inner surface of the cover plate 114. A recess 176 is also in communication with the bore 120 of the wobble shaft 92 through radial passages extending through the shaft 92.

As previously mentioned, the valving arrangement 106 which includes the commutator valve plate 110 plays a vital roll in directing the fluid into and out of the volumetrically varying chambers in timed relation to the hypocycloidal movement of the rotor 82 with respect to the stator 80 and is included in a primary fluid circuit which extends between the input/output ports 180 and 188 of the motor.

A source of pressurized fluid is connected to an opening or port 180, schematically indicated by a broken line, and flows into a chamber 182 and into a flow passage 118 situated immediately interiorly of and adjacent to the wall 86 of the casing 62. Pressurized fluid then flows through radially overlapping angularly spaced grooves 184 and the aperture 162 formed respectively in the faces 152 and 170 of the plates 108 and 112 and into a chamber 186 surrounding the commutator valve plate 110.

Regardless of the position of the commutator valve plate 110, at least one of the flow passages 152 formed in the manifold plate 108 communicates with the chamber 186 and directs the pressurized fluid through its respective dog legged passage 148 to the flow passages communicating therewith. The pressurized fluid is then communicated into the flow passage 146 formed in the plate 106 in register with the pressurized fluid passage 71 and then into a fluid chamber pocket formed between the vane members 90 of the stator 80. Pressurization of one or more of the fluid chambers in any portion of the rotor 82 imparts a rotating force to the rotor in one direction of rotation.

Each of the fluid chambers in communication with the pressurized fluid expands in size because of the simultaneous orbital and rotational movement of the rotor 82; whereas, the chambers which are not in communication with the pressurized fluid contract as the lobes of the rotor 82 begin to move into the chambers and force the fluid therefrom. The fluid in the chambers which are being reduced in size is directed through the radial passages 128 of the intermediate plate 106 which correspond to the contracting chambers and then through passages 146 to the corresponding dog legged passages 148. The fluid then flows through the associated passages 152 formed at the distal ends of the corresponding passages 148 and then through the passage 176 formed in the commutator plate 110, bores 178, 120, 122 in the wobble shaft 92 and the bore 124 formed in the drive sleeve 66 and out of the body 60 through a passage 190 and a port 188 which is located generally opposite to the port 180 which was only schematically illustrated.

As the rotor 82 rotates through an orbital path as a result of the successive pressurization of circumferentially adjacent fluid chambers, the wobble shaft 92 is also rotated along with the rotor 82 and orbits at the orbit speed of the rotor. In the embodiment discussed above, the stator 80 has seven lobes or teeth and the rotor 82 has six. Therefore for each revolution thereof the rotor 82 will orbit six times. The wobble shaft 92 orbits at the point 100 about the pivotal end or point 96 at the orbiting speed of the rotor 82.

Since the commutator valve plate 110 is coupled to the nose of the wobble shaft 92, it will also be orbited at the orbit speed of the rotor 82. By referring to the drawings it will be appreciated that the commutator valve plate 110 alternately and sequentially opens and closes the radially angularly adjacent passages 152 with the fluid pressurized chamber 186 as it orbits in timed relation to the orbital movement of the rotor 82 whereby the fluid pockets or chambers sequentially and alternately expand under the driving force of the pressurized fluid and then contract to expel the fluid therefrom.

The wobble shaft 92 is coupled to the output shaft 18 by way of the drive sleeve 66 and thus rotates the shaft 18 at the speed of rotation of the rotor 82. Operation of the motor 12 and rotation of the shaft 18 continue as long as the port 180 of the body 60 is connected to the source of pressurized fluid.

In order to reverse the direction of rotation of the shaft 18 it is only necessary to connect the port 188 to the source of pressurized fluid rather than the port 180. The pressurized fluid will then flow through the hydraulic device 12 in a direction opposite to that described above, thereby causing the rotor 82 to rotate in the opposite direction.

From the foregoing description, it can be seen that when the motor 12 is operated in either direction, a primary fluid circuit is established between the ports 180 and 188 by way of the commutator valve plate 110, regardless of the direction of rotation of the output shaft.

The present invention provides a secondary fluid circuit in communication with the primary fluid circuit for shuttling a portion of the fluid from the low pressure side of the motor to a separate line for cooling before that fluid is again subjected to pressurization by the source.

Figure 3:
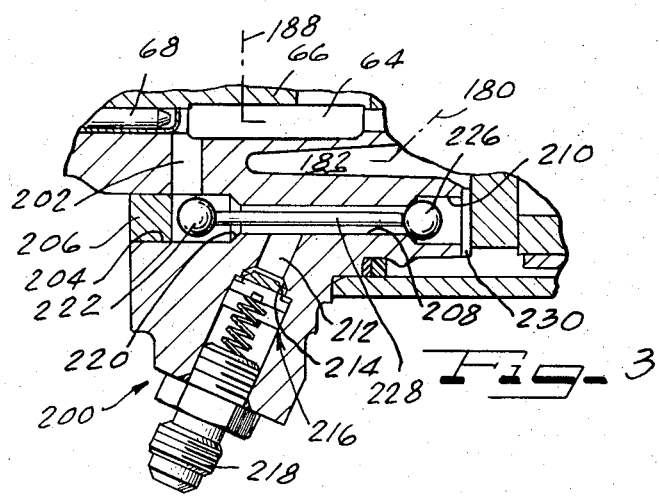
FIG. 3 is a fragmentary view of a portion of the hydraulic motor illustrated in FIG. 2 and specifically showing shuttle valve operation in response to a pressure differential of the opposite direction.

Referring now to FIGS. 2 and 3 together, a shuttle valve structure 200 is illustrated as it may advantageously be incorporated in the motor 12 described above. The structure in FIG. 2 shows the shuttle valve 200 as it would appear when the port 188 is connected to a source of pressurized fluid; whereas, FIG. 3 illustrates the valve condition where the port 180 is connected to the source of pressurized fluid.

Referring first to FIG. 2, the shuttle valve 200 is illustrated as comprising a first radially extending bore 202 which communicates with a longitudinally extending bore 204. The bore 204 is closed off at the output shaft end of the motor by a plug 206. The other end of the bore 204 communicates with a similar bore 210 by way of a smaller diameter bore 208. The bore 202 is in fluid communication with the port 188 by way of the cylindrical chamber 64 and the passage 190. The bore 210 is in fluid communication with the port 180 by way of a groove 230 and the chamber 182. It will be appreciated that the groove 230 also provides communication between the chamber 182 and the annular fluid flow passage 118 which provides communication with the commutator valve plate 104.

The passage 208 is connected in fluid communication with the exterior of the motor by way of a passage 212 which extends to a port, here shown adapted for connection to a hydraulic line by way of a connector 218.

The point of communication of the passage 208 and the passage 212 is located between a pair of valve seats 220 and 224 formed at the points of communication between the passages 204, 208 and 208, 210, respectively. The valve seat 220 is provided with a spherical or ball type valve member 222 and the valve seat 224 is similarly provided with a valve member 226. A rod 228 extends through the passage 208 and is of substantially smaller diameter than the passage 208. The rod 228 and the valve members 222 and 226 may be connected in any suitable manner, such as by threads or the like.

Assuming that the port 188 is connected to the source of pressurized fluid and the port 180 is connected to return fluid to the source, it will be understood that a high pressure condition is communicated to the shuttle valve by way of the passage 190, the cylindrical chamber 64 and the passage 202 to place the high pressure condition in the passage 204 and against the valve member 222. At the same time, a low pressure condition is transmitted by way of the port 180, the chamber 182 and the groove 230 to the passage 210 and the passage 208. With this pressure differential across the movable valve members, the valve member 222 moves toward the right to seat against the valve seat 220, causing the rod 228 to move toward the right and therewith move the valve member 226 toward the right. A portion of the low pressure fluid is then permitted to flow from the chamber 118 and out of the connector 218 over a path which includes the groove 230, the passage 210, the passage 208 and the passage 212. A valve 216 may advantageously be provided in the passage 212 to sealingly engage a valve seat 214 to ensure that the pressure of the shuttle flow is greater than that in the shuttle flow line to protect the motor against reverse pressures which could cause interruption or stalling of the motor operation. The valve 216 may be constructed to open at any suitable low pressure.

In FIG. 3, the shuttle valve 200 is illustrated for opposite motor operation wherein the port 180 is connected to the source of pressurized fluid and the port 188 is connected to return fluid to the source. In this case, the high pressure is on the right hand side of the valve member 226 by virtue of the communication of the passage 210 with the port 180 by way of the chamber 182 and the groove 230. Low pressure is, of course, communicated to the left hand side of the valve structure by way of the chamber 64.

Figure 4:
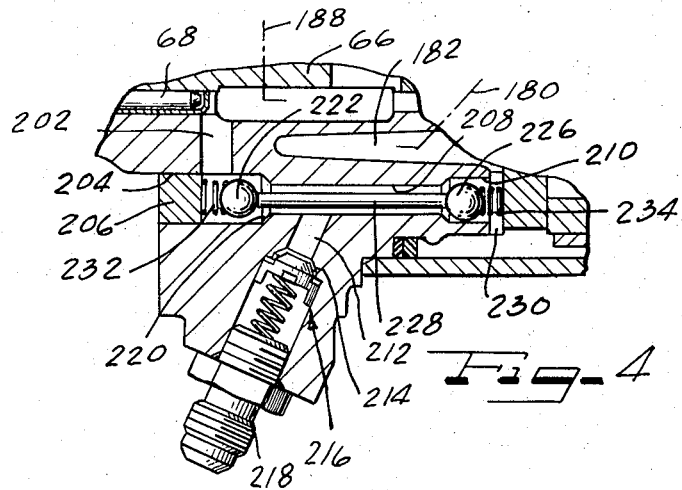
FIG. 4 is a fragmentary view of a portion of a hydraulic motor similar to that illustrated in FIG. 2 and specifically showing a shuttle valve construction for dead band operation.

Referring to FIG. 4, the shuttle valve is provided for operation in systems where a neutral dead band is provided, for example with manually controlled swash plate pumps. In this construction, the shuttle valve is identical to that described above, with the exception that each of the valve members 222 and 226 are provided with a respective centering spring 232 and 234 which biases the valve to an open condition. With this structure, fluid is permitted to flow around the valve members 222 and 226 until there is a flow restriction and pressure drop across the restriction which is sufficient to cause compression of one of the centering springs to close off the flow and permit rotation of the motor. As this flow is pinched off and one of the valve members seats, shuttle flow continues about the other valve member.

Although I have described my invention by reference to specific illustrative embodiments thereof, many changes and modifications may become apparent to

I claim:

1. A hydrostatic drive system comprising:
a hydraulic motor including a housing having first, second and third ports, an output shaft mounted for rotation, means in a primary fluid circuit disposed in said housing between said first and second ports and connected to said shaft for causing rotation of said shaft in response to fluid flow therethrough, a secondary fluid circuit disposed in said housing between said primary fluid circuit and said third port, and valve means in said secondary fluid circuit for bypassing a portion of the fluid received in said primary fluid circuit out of said housing through said third port;
a first pump including three ports and operable to discharge fluid at a first flow rate from a second of said ports, at a second flow rate from a third of said ports and receive fluid at said first and second flow rates combined at a first of said ports;
a heat exchanger connected to receive the fluid discharged from said third ports of said motor and said first pump for cooling and discharging the fluid;
a reservoir connected to receive the fluid discharged from said heat exchanger; and
a second pump connected between said reservoir and said first pump for providing said pump with fluid equal to the fluid cooled in said heat exchanger.

2. The hydrostatic drive system set forth in claim 1, comprising:
a first check valve connected between said second pump and said first port of said first pump; and
a second check valve connected between said second pump and said second port of said first pump, said check valves respectively operable to pass fluid from said second pump to the low pressure fluid receiving one of said first and second ports of said first pump.

3. The hydrostatic drive system set forth in claim 1, wherein said valve means comprises:
a first fluid passage extending between two points in said first fluid circuit of different pressure,
a second fluid passage extending from said first fluid passage to said third port of said motor, and
first and second valves in said first fluid passage on opposite sides of the point of communication with said second fluid passage and respectively operable in response to opposite directions of the pressure differential between said two points.

4. A reversible hydraulic motor comprising a housing having first, second and third ports, said first port serving as an inlet port for receiving fluid at a relatively high pressure during operation of said motor in a first direction and serving as an outlet port for discharging fluid at a relatively low pressure during operation of said motor in a second direction, said second port serving as an outlet port for discharging fluid at a relatively low pressure during operation of said motor in the first direction and serving as an inlet port for receiving fluid at a relatively high pressure during operation of said motor in the second direction, a rotatable output shaft extending from said housing, a primary fluid circuit in said housing extending between said first and second ports, said primary fluid circuit including drive means connected with said shaft for causing rotation of said shaft in response to fluid flow through said drive means, first passage means disposed in said housing for conducting fluid at a relatively high pressure from said first port to said drive means during operation of said motor in the first direction and for conducting fluid at a relatively low pressure from said drive means to said first port during operation of said motor in the second direction, and second passage means disposed in said housing for conducting fluid at a relatively low pressure from said drive means to said second port during operation of said motor in the first direction and for conducting fluid at a relatively high pressure from said second port to said drive means during operation of said motor in the second direction, and a secondary fluid circuit disposed in said housing and extending between said primary fluid circuit and said third port, said secondary fluid circuit including valve means disposed in said housing for bypassing a portion of the fluid traversing said primary fluid circuit to said third port during fluid flow through said primary fluid circuit, third passage means disposed in said housing for conducting fluid at a relatively low pressure from said second passage means to said valve means during operation of said motor in the first direction, fourth fluid passage means disposed in said housing for conducting fluid at a relatively low pressure from said first passage means to said valve means during operation of said motor in the second direction, and fifth passage means disposed in said housing for conducting fluid at a relatively low fluid pressure from said valve means to said third port during operation of said motor in the first and second directions.

5. A reversible hydraulic motor as set forth in claim 4 wherein said valve means is actuatable under the influence of fluid pressure to a first condition upon operation of said motor in the first direction and is actuatable under the influence of fluid pressure to a second condition upon operation of said motor in the second direction, said valve means being effective to block fluid flow from said fourth passage means to said fifth passage means and to enable fluid to flow from said third passage means to said fifth passage means when said valve means is in the first condition, said valve means being effective to block fluid flow from said third passage means to said fifth passage means and to enable fluid to flow from said fourth passage means to said fifth passage means when said valve means is in the second condition.

6. A reversible hydraulic motor as set forth in claim 4 wherein said valve means includes a first valve seat disposed in said housing and connected in fluid communication with said third and fifth passage means, a second valve seat disposed in said housing and connected in fluid communication with said fourth and fifth passage means, a first valve member disposed in said housing and movable between an open condition spaced apart from said first valve seat and a closed condition disposed in sealing engagement with said first valve seat, a second valve member disposed in said housing and movable between an open condition spaced apart from said second valve seat and a closed condition disposed in sealing engagement with said second valve seat, and means interconnecting said valve members for moving one of said valve members from the open condition to the closed condition upon movement of the other valve member from the closed condition to the open condition.

7. A reversible hydraulic motor as set forth in claim 6 wherein said first and second valve members have a generally spherical configuration and said means interconnecting said valve members includes a rod having one end portion connected with the first valve member and another end portion connected with the second valve member.

8. A reversible hydraulic motor as set forth in claim 6 comprising means for biasing both of said valve members away from their respective seats until flow restriction increases sufficiently to close one of the valves to establish a dead band flow.

9. A reversible hydraulic motor as set forth in claim 8 wherein said biasing means comprises a pair of springs each disposed between a respective valve member and stationary wall of an associated one of said passages.

* * * * *